June 9, 1964 ASAHIKO GOTO 3,136,610

BONDED STRUCTURE FOR TUBULAR OR CYLINDRICAL BODIES

Filed Jan. 17, 1961

Inventor
ASAHIKO GOTO
By Hall & Houghton
Attorney

United States Patent Office 3,136,610
Patented June 9, 1964

3,136,610
BONDED STRUCTURE FOR TUBULAR OR
CYLINDRICAL BODIES
Asahiko Goto, Nada-ku, Kobe, Japan, assignor to Kobe
Steel Works, Ltd., Fukiai-ku, Kobe, Japan
Filed Jan. 17, 1961, Ser. No. 83,260
Claims priority, application Japan June 10, 1960
1 Claim. (Cl. 29—183)

The present invention relates to a structure for securing to a titanium or zirconium inner cylindrical body an outer cylindrical body made of a metal other than titanium or zirconium.

It should be understood that the term "titanium" or "zirconium" as used in the specification and claims is intended to mean not only pure titanium or zirconium respectively but also titanium base alloys or zirconium base alloys respectively. It should also be noted that the term "inner cylindrical body" is intended to mean not only a relatively large cylindrical body such as various reaction vessels, columns, towers, shells or the like, but also a relatively small tube, pipe or the like. The term "outer cylindrical body" as herein used is intended to mean a cylindrical body made of a metal (such as steel, stainless steel, etc.) other than titanium or zirconium and has a diameter larger than that of the inner cylindrical body and adapted to be secured around the inner cylindrical body with a space. A typical example of the outer cylindrical body is a cylindrical jacket mounted around an inner reaction vessel or distillation column with a space therebetween, said space serving to circulate a cooling or heating medium.

Titanium, zirconium and their alloys are well known to have various excellent properties including corrosion and chemical resistance, so that they are useful particularly in apparatus, equipments and plants such as reaction vessel, column, tower, tank, shell or the like which are required to be anticorrosive. However, titanium, zirconium and their alloys have fatal drawback that they are not readily weldable to other metals.

In some instances, it has been proposed to secure a titanium or zirconium body or member to different metal body or member by means of a mechanical element such as screw, bolt, pin or the like. However, by such mechanical element, it is impossible to rigidly and fluid tightly bond the both members, because in such connection by means of a mechanical element there is inevitably formed a very small clearance or the like. This is a fatal drawback particularly when a vessel, column, pipe or the like is required to handle or treat fluids.

Therefore, it is an object of this invention to overcome these drawbacks in securing a zirconium or titanium structural member to a separate structural member made of a metal other than titanium or zirconium.

It is a more particular object of the invention to provide a novel structure for rigidly and fluid tightly securing to an inner cylindrical body of titanium or zirconium an outer cylindrical body made of another metal.

It is another object of the invention to provide a novel bonding structure of the type mentioned above with a minimum number of screws or even without using such elements.

It is still another object of the invention to rigidly and fluid tightly secure to an inner cylindrical body of titanium or zirconium an outer cylindrical body of another metal with a space therebetween so as to form a heating or cooling jacket for the inner cylindrical body.

It is still another object of the invention to rigidly and fluid tightly secure a zirconium or titanium pipe such as feed or discharge pipe to a reaction vessel, column, shell or the like which has a zirconium or titanium liner inside thereof.

Briefly, according to one aspect of this invention, an inner cylindrical body made of titanium or zirconium is provided, at its desired periphery portion, integrally or separately with a ring or annular band made of titanium or zirconium. When the ring is separate it is welded on the periphery of the inner cylindrical body so as to obtain a substantially integral connection therebetween. An outer cylindrical body made of another metal is provided, at its inner periphery corresponding to said ring or annular band, integrally or separately with another ring or annular band made of the same metal as that of the outer cylindrical body. These two rings or annular bands are fastened together by means of a screw or threaded engagement. The joint or juncture between these two rings is brazed. These rings also serve as a spacer between the inner and outer cylindrical bodies to form a desired space therebetween. According to this structure, since the rings are substantially integral with the respective cylindrical bodies and these rings are mechanically connected and furthermore are brazed at the juncture, the bonded structure, as a whole, is rigid and completely fluid tight.

The invention, both as to the bonding structure and method for accomplishing the same, together with further objects and advantages thereof, will best be understood from the following detailed description taken in connection with the accompanying drawings in which.

For convenuience of explanation, in the following description an inner cylindrical body and associated ring are described as to be made of titanium, but it should be understood that the invention is equally applicable to those made of a titanium alloy, zirconium or a zirconium alloy. Therefore, the term "titanium" as hereinafter appears may be replaced by the term "zirconium," "a titanium alloy" or "a zirconium alloy" where these members are made of these materials respectively.

Figure 1:
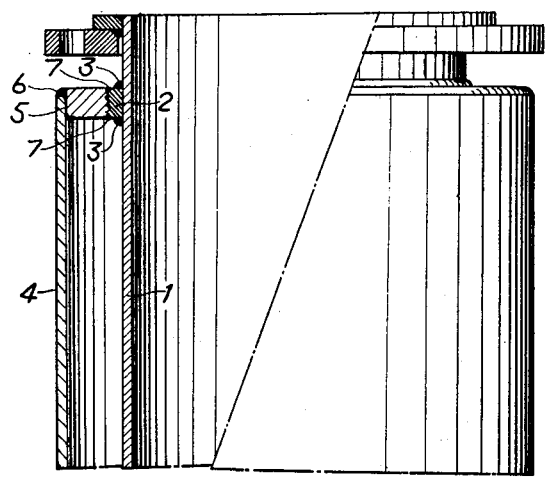
FIG. 1 is a side elevation, partly in longitudinal section, of a titanium or zirconium tower shell provided with an outer jacket for a cooling or heating medium.

Referring to the drawings, particularly FIG. 1, a shell 1 made of titanium is provided at its periphery adjacent the upper end thereof with an external ring 2 also made of titanium. The ring 2 is substantially integrally bonded to the shell 1 by means of welding 3, 3 along its inner periphery. A jacket 4 made of steel or stainless steel and having a diameter greater than that of the shell 1 is provided at its inner periphery adjacent the upper end thereof with an internally threaded ring 5 which is made of steel or stainless steel. The ring 5 is substantially integrally bonded to the jacket 4 by means of welding 6. These rings 2 and 5 are in threaded engagement as is shown and the junctures are chemically connected along the length by means of brazing (such as with silver or a silver alloy) at 7, 7. By this structure, the jacket 4 is rigidly and in a fluid tight manner bonded to the shell 1 with a space therebetween. It will be understood that the lower ends of the jacket 4 and shell 1 may be bonded by means of the same structure.

Figure 2:
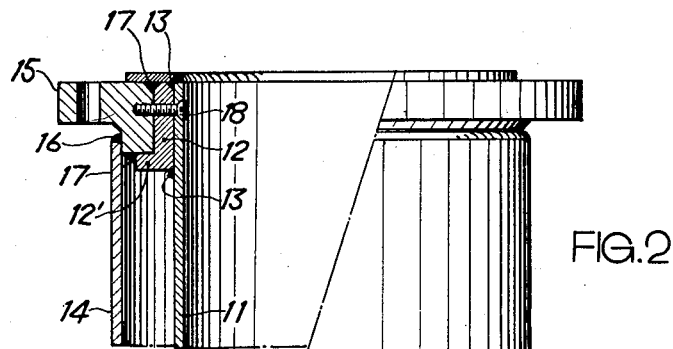
FIG. 2 is a view similar to FIG. 1 but showing another embodiment of the invention.

The embodiment shown in FIG. 2 is the same as that shown in FIG. 1 except for the arrangement and bondage between the rings. More particularly a ring 12 made of titanium is welded to the shell 11 by means of welding 13, 13. The ring 12 has an externally projecting annular flange 12' a its lower end. A steel or stainless steel ring 15 bonded to a jacket 14 by means of welding 16 is adapted to fit at its inner side face with the outer side face of the ring 12. Further, the bottom of the ring 15 is adapted to be fittingly seated on the upper face of the flange 12' as shown. The bottom of the ring 15 is brazed at 17 to the adjacent edge of the flange 12'. Similarly, the upper inner edge of the ring 15 is brazed at 17 to the upper outer edge of the ring 12.

Preferably, the brazing is effected with silver or a silver alloy. In this embodiment, the rings 12 and 15 are bonded together by means of a locking screw 18 instead of the threaded engagement shown in FIG. 1. In the particular structure shown, the screw 18 is threaded from the inside of the shell through the shell 11 and ring 12 into the ring 15. In this case the screw 18 is made of titanium and its head is arc welded to the shell 11. It is also possible to extend the screw 18 from the outside of the ring 15 through the ring 15, ring 12 and into the shell wall 11. As will be understood, there is provided a suitable number of such screws 18 at intervals along the periphery of the structure.

Figure 3:
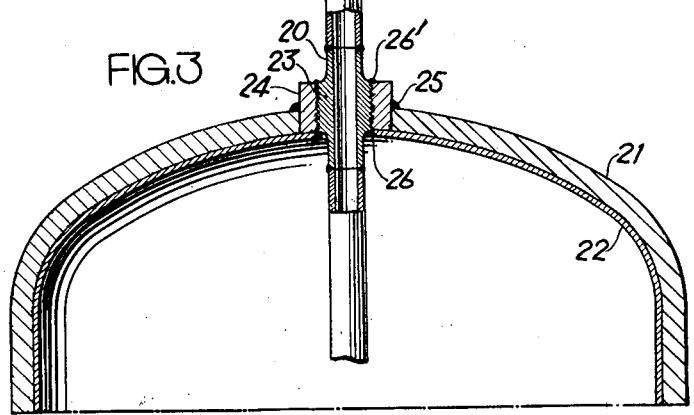
FIG. 3 is a longitudinal section of a part of a steel vessel with a titanium or zirconium liner and a titanium or zirconium pipe secured to the vessel so as to extend into the interior thereof.

In the embodiment shown in FIG. 3, an outer cylindrical body or vessel 21 made of steel and having an internal liner 22 of titanium is bonded to an inner cylindrical body or a tube 20 made of titanium. The tube 20 is formed integrally with an enlarged portion in the form of a ring 23 externally threaded. A separate ring 24 made of steel and having an internally threaded opening adapted to receive and engage the enlarged ring 23 is fitted in an opening formed through the wall of the vessel 21 except the liner 22. Thus the bottom of the ring 24 seats against the liner 22. The ring 24 is welded to the vessel 21 at 25 along its periphery adjacent the vessel wall surface. The liner 22 is formed with an opening through which the tube 20 extends into the interior of the vessel 21. The tube 20 is threaded at the enlarged ring portion 23 within the threaded opening in the ring 24. Preferably the circular juncture between the ring 24 and the ring 23 is brazed at 26' with silver or a silver alloy. Along the lower circular juncture between the ring 23 and the liner 22, welding 26 is carried out. By this structure the tubular member 20 is rigidly and in a fluid tight manner bonded to the vessel 21.

While some particular embodiments of the invention have been shown and described it will be recognized that various modifications will readily occur to those skilled in the art and it is therefore contemplated by the appended claim to cover any such modifications as fall within the spirit and scope of the invention.

What I claim is:

A structure, comprising, in combination:
(a) an outer hollow cylindrical body made of ferrous metal;
(b) an inner hollow cylindrical body made of a material selected from the group consisting of titanium and zirconium; and
(c) means connected to said bodies for securing said inner body within said outer body, said means including
  (1) a ring of the same material as said inner body and provided substantially integrally around said inner body, and
  (2) a ring made of the same material as said outer body and provided substantially integrally on the inner periphery of said outer body and in engagement with said inner body ring, said rings being mechanically held together in a detachable manner by a threaded connection and the juncture between them being brazed to permanently connect them together.

References Cited in the file of this patent

UNITED STATES PATENTS

| | | |
|---|---|---|
| 1,014,097 | Rupp | Jan. 9, 1912 |
| 2,439,266 | Settle | Apr. 6, 1948 |

OTHER REFERENCES

The Welding Journal, "Fabrication of a Zirconium-Lined Reaction Vessel," February 1954, pages 115–118.